April 13, 1948.    J. W. STEINMEYER    2,439,637
METHOD OF PREPARING WELDABLE FERROUS MEMBER HAVING A HIGH CARBON FACE
Filed Nov. 6, 1943
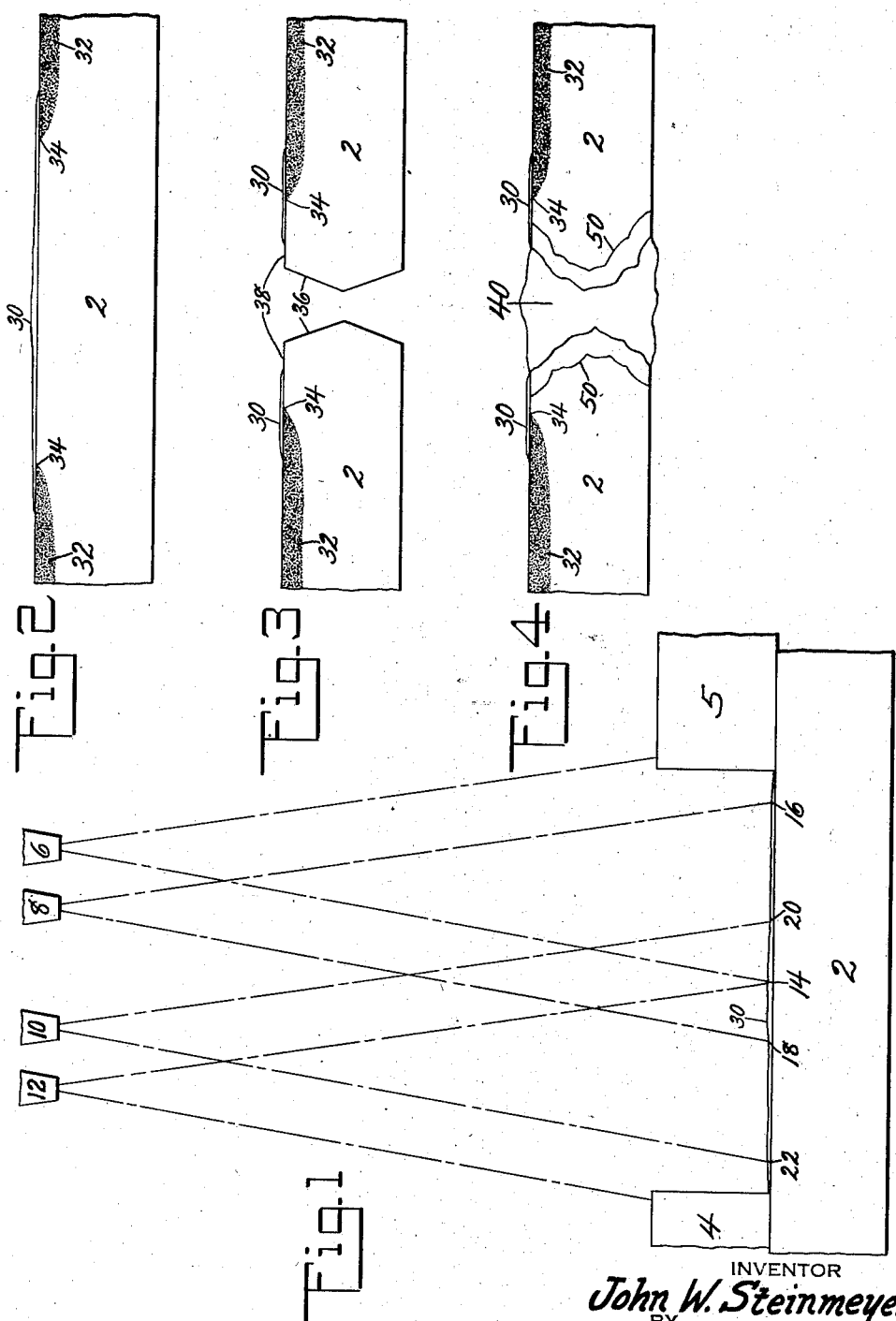
INVENTOR
John W. Steinmeyer
BY
Robert A. Shields
ATTORNEY Patented Apr. 13, 1948

2,439,637

UNITED STATES PATENT OFFICE 2,439,637

METHOD OF PREPARING WELDABLE FERROUS MEMBERS HAVING HIGH CARBON FACES

John W. Steinmeyer, Berwick, Pa., assignor to American Car and Foundry Company, New York, N. Y., a corporation of New Jersey Application November 6, 1943, Serial No. 509,241

5 Claims. (Cl. 148—19)

This invention relates to a weldable metal member and the method of preparation in general and in particular to a homogeneous member composed of weldable and non-weldable portions.

It has been almost impossible in the past to weld certain types of metal together, due to the high carbon content of portions of the metal. This has been found to be particularly true in the welding of armor plate in which the center and back portions are formed of a relatively low carbon steel, while the face or outer portion is composed of a comparatively high carbon steel. Attempts to mask or protect the low carbon steel plate prior to carburizing have in the past resulted in failure since no effective masking arrangement had been devised which would withstand the high heat and prevent passage of carbon into the plate at the area where a weld was to be made. It is an object, therefore, of the present invention to produce a homogeneous weldable member having parts formed of non-weldable material gradually merging into a weldable material in the areas to be welded.

A further object of the invention is the production of a metal member of relatively low carbon content onto which is placed a protective non-ferrous metal coating in the area to be welded and prior to carburization of the member.

A still further object of the invention is the production of a homogeneous weldable metal member having a non-weldable face portion gradually merging into a weldable face portion sufficiently far from the area to be welded in order that it may be beyond the dangerous heat zone of the weld.

These and other objects of the invention will be apparent to persons skilled in the art from a study of the following description and accompanying drawings, in which Fig. 1 is an elevational view disclosing the manner of applying the protective coating;

Fig. 2 is an elevational view of a part of the plate disclosing the relation of the protective coating and hard face after the carburizing treatment;

Fig. 3 is a similar view showing the plates prepared for welding, and

Fig. 4 is a similar view showing the plates welded together.

Referring now to the drawings in detail it will be seen that the metal member 2, which in the present instance is of a ferrous material having a carbon content between .05 percent and .3 percent, has an area thereof defined between loose protecting strips 4 and 5. The area between the loose protecting strips 4 and 5 is adapted to be coated with a non-ferrous material, such as copper, sprayed or otherwise applied from nozzles 6, 8, 10 and 12. As clearly shown, the material discharged from the nozzles defines cones as indicated by line and dash. A portion of the material forming the discharge cone of nozzles 6 and 12 will strike the adjacent protecting strips 5 and 4, while the remainder will deposit a coating on plate 2 extending from the edges of plates 5 and 4 to point 14. The material discharging from nozzle 8 will cover an area extending from point 16 to point 18, while that discharging from nozzle 10 will extend from a point 20 to a point 22. By arranging the nozzles as shown the areas of plate 2 between strip 4 and point 22 and between strip 5 and point 16 will receive a single coating of non-ferrous material. The areas of plate 2 between points 16 and 20 and 18 and 22 will receive two coats of non-ferrous material, while the area between points 18 and 20 will receive three coats of material, that is one coat from nozzle 8, one coat from nozzle 10, and a half coat reaching to point 14 from nozzles 6 and 12. The various coats may be applied to plate 2 either by simultaneous operation of the nozzles or by successive passages of a single nozzle or of nozzles arranged in pairs, the main idea being to deposit a non-ferrous material on plate 2 so as to have side edges of a relatively thin deposit increasing in thickness toward the center. It is well known that sprayed metal is more or less porous and accordingly it is necessary in order to fully protect plate 2 at the area to be welded for the sprayed metal to increase to a sufficient thickness to prevent passage of carbon into plate 2.

After deposition of the non-ferrous coating 30, as just described, the plate 2 is given a carburizing treatment in which the plate is subjected to high temperature in the presence of suitable carbon deposit. During this carburizing treatment the plate 2 will absorb carbon through the surface exposed to the carbon material. However, due to the application of the non-ferrous coating 30, carbon cannot reach the plate in the areas which are fully protected by two or more passages of the spray. Due to the porosity of the metal spray in the areas of single thickness, some carbon will pass through, that is, in the areas defined between protecting strip 4 and point 22 and protecting strip 5 and point 16. The carbon which passes through the single thickness area of non-ferrous metal, combining with that which soaks in around the edge, will produce a gradually tapering off of the carbon content adjacent the surface of plate 2. Such tapering action is clearly shown in Fig. 2 which is taken from an etched section of a plate. As clearly shown, the area 32 of high carbon content disappears at a point 34 slightly inward of the area protected by the single thickness of non-ferrous metal. In the carburizing treatment given plate 2 in an actual test the carbon content of area 32 ranged above .75 percent and, therefore, was of the type of ferrous metal considered non-weldable. As illustrated in Figs.

1 and 2 the protective coating has been shown as applied to an intermediate part of plate 2, but it is to be understood that it may also be applied to an edge portion or to any other portion of the member at which it is desired to apply weld metal for any purpose, such as joining similar members together.

After the protected plate or member has been carburized it may be prepared for welding by beveling the edges, such as at 36, Fig. 3, and by removing at least a part of the non-ferrous coating from an area 38 adjacent the trimmed edges. The point at which the plates are beveled, that is, the distance between the bevel and the point 34 at which the high carbon surface merges into the low carbon plate, is predetermined in accordance with the thickness of plate and the amount of weld metal 40 to be applied, that is, the distance is so chosen as to prevent the dangerous heat zone, as indicated by outline 50, from reaching the high carbon metal. In this way chill cracks, etc., are eliminated and a strong weld is obtained.

It is to be understood that the distance between protecting strips 4 and 5, which are merely laid on plate 2 and later removed, may be varied as may be the distance between the nozzle positions and between the nozzles and plate to thereby obtain different layer deposits on the plate and different widths of protective coating. The arrangement of nozzles and area protected is, of course, selected so that the area receiving the greatest thickness of deposit will appear at the point at which weld metal will later be deposited. It is also important that the areas receiving the single coating of non-ferrous material should be sufficiently great as to obtain the proper gradual tapering of the high carbon surface toward the area to be welded. It will be obvious also that non-ferrous materials, other than copper, may be used, as well as certain non-metallic substances which are capable of withstanding the high carburizing temperatures while remaining impervious to passage of carbon.

While the production of the homogeneous weldable plate member has been described more or less in detail, it will be obvious to persons skilled in the art that various modifications in procedure and choice of materials may be made and all such materials and choices are contemplated as will fall within the scope of the appended claims defining my invention.

What is claimed is:

1. The method of producing a weldable ferrous-metal member having a non-weldable high carbon face and a weldable low carbon center comprising, spraying non-ferrous metal onto a portion of a low carbon member in successive layers of decreasing width to form a protective coating having a relatively thin edge portion gradually merging into a materially thicker portion, subjecting the member to a carburizing treatment to produce a high carbon face which gradually disappears beneath the protective coating substantially in accordance with the coating thickness, and removing a portion at least of the non-ferrous metal coating to expose an uncarburized face portion for reception of welding metal.

2. The method of producing a weldable ferrous-metal member having a non-weldable high carbon face and a weldable low carbon center comprising, spraying non-ferrous metal onto a portion of a low carbon member to produce a slightly porous protective coating of single thickness adjacent an edge and a protective coating of multiple thicknesses inwardly from said single layer, subjecting the member to a carburizing treatment to produce a high carbon face which gradually disappears beneath the protective coating in accordance with the thickness and porosity thereof, and removing at least a portion of the non-ferrous metal coating to expose an uncarburized face portion for reception of welding metal remote from the edge of the high carbon face.

3. The method of welding together metal members including at least one member hardenable by a treatment including a carbon absorption cycle comprising, applying a metallic spray coat gradually increasing in thickness inwardly from at least one edge of the coat to protect a portion of the unhardened but hardenable member, subjecting the entire hardenable member to a hardening treatment including a carbon absorption cycle thereby securing a gradual tapering away of the hardened metal beneath the spray coat edge and substantially in accordance with the spray coat thickness, removing a portion at least of the metallic spray coat to expose an unhardened portion of the hardened member, and applying welding metal to said unhardened portion of the hardened member to join a second metal member thereto.

4. The method of producing a weldable ferrous-metal member having a non-weldable high carbon face and a weldable low carbon center comprising, spraying non-ferrous metal onto a portion of a low carbon member to produce a slightly porous protective coating of single thickness adjacent an edge and a protective coating of multiple thicknesses inwardly from said single layer, subjecting the member to a carburizing treatment to produce a high carbon face which gradually disappears beneath the protective coating in accordance with the thickness and porosity thereof.

5. The method of producing a weldable ferrous metal member having a non-weldable high carbon face and a weldable low carbon center comprising, spraying non-ferrous metal onto a portion of a low carbon member to form a coat of non-ferrous metal increasing in thickness and decreasing in porosity inwardly from at least one edge thereof, subjecting the member to a carburizing treatment to produce a high carbon face which disappears beneath the coating substantially in accordance with the thickness and porosity thereof.

JOHN W. STEINMEYER.

REFERENCES CITED

The following references are of record in the file of this patent:

UNITED STATES PATENTS

| Number | Name | Date |
|---|---|---|
| 117,199 | Nichols | July 18, 1871 |
| 873,512 | Davis | Dec. 10, 1907 |

FOREIGN PATENTS

| Number | Country | Date |
|---|---|---|
| 2,730 | Great Britain | Oct. 9, 1863 |

OTHER REFERENCES

"Protective Coatings for Metals," Burns and Schick, 1939, page 197.